(12) United States Patent
Bucknell et al.

(10) Patent No.: US 8,528,327 B2
(45) Date of Patent: Sep. 10, 2013

(54) FORCED INDUCTION AND EXHAUST SYSTEM

(75) Inventors: John R. Bucknell, Royal Oak, MI (US); Dominique T. Lester, Oxford, MI (US); Rodney E. Baker, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 202 days.

(21) Appl. No.: 13/110,123

(22) Filed: May 18, 2011

(65) Prior Publication Data

US 2012/0291431 A1    Nov. 22, 2012

(51) Int. Cl.
    *F02D 23/00*    (2006.01)
    *F01N 3/00*    (2006.01)
    *F01N 3/02*    (2006.01)

(52) U.S. Cl.
    USPC ................................. 60/602; 60/311; 60/288

(58) Field of Classification Search
    USPC .......................................... 60/602, 280, 311
    See application file for complete search history.

(56) References Cited

U.S. PATENT DOCUMENTS

| | | | |
|---|---|---|---|
| 6,354,078 B1 * | 3/2002 | Karlsson et al. | 60/274 |
| 2002/0078934 A1* | 6/2002 | Hohkita et al. | 123/564 |
| 2004/0067177 A1* | 4/2004 | Thieman et al. | 422/177 |
| 2009/0145116 A1* | 6/2009 | Miyashita et al. | 60/286 |

FOREIGN PATENT DOCUMENTS

| | | | |
|---|---|---|---|
| DE | 4139291 A1 * | 6/1993 | |
| DE | 4311904 A1 * | 10/1994 | |
| DE | 19503748 A1 * | 6/1996 | |
| DE | 19654026 A1 * | 6/1998 | |
| FR | 0266256 A1 * | 5/1988 | |
| JP | 2259224 * | 3/1989 | |
| JP | 4370327 A * | 12/1992 | |

OTHER PUBLICATIONS

Machine translation of DE 19654026 A1 obtained from espacenet.com (see attached).*

* cited by examiner

*Primary Examiner* — Thomas Denion
*Assistant Examiner* — Ngoc T Nguyen
(74) *Attorney, Agent, or Firm* — Cantor Colburn LLP

(57) ABSTRACT

In one exemplary embodiment of an exhaust system, the system includes an exhaust manifold in fluid communication with an internal combustion engine and a forced induction device in fluid communication with the exhaust manifold, the forced induction device including a housing. The system further includes a flow control device to control fluid communication between the forced induction device and a catalyst substrate and to control fluid communication between the exhaust manifold and the catalyst substrate.

19 Claims, 3 Drawing Sheets

FORCED INDUCTION AND EXHAUST SYSTEM

FIELD OF THE INVENTION

The subject invention relates to internal combustion engines, and, more particularly, to exhaust systems and forced induction systems for internal combustion engines.

BACKGROUND

An engine control module of an internal combustion engine controls the mixture of fuel and air supplied to combustion chambers of the engine. After the air/fuel mixture is ignited, combustion takes place and the combustion gases exit the combustion chambers through exhaust valves. The combustion gases are directed by an exhaust manifold to a catalyst (or "catalytic converter") and/or other exhaust after treatment systems.

During engine operating periods, such as during startup, combustion gases enter the exhaust system while components of the after treatment system, such as the catalyst, are not yet heated to adequately remove pollutants to meet regulations. Further, during startup, forced induction devices include components, such as turbine wheels, which act as heat sinks, thereby slowing down heating of exhaust system components. Therefore, during startup, the flow of exhaust gas to cool exhaust system components, such as the catalyst, can lead to undesirable emission levels, due to the corresponding lower performance of the catalyst.

SUMMARY OF THE INVENTION

In one exemplary embodiment of the invention, an exhaust system includes an exhaust manifold in fluid communication with an internal combustion engine and a forced induction device in fluid communication with the exhaust manifold, the forced induction device including a housing. The system further includes a flow control device to control fluid communication between the forced induction device and a catalyst substrate and to control fluid communication between the exhaust manifold and the catalyst substrate.

In another exemplary embodiment of the invention an exhaust system includes an exhaust manifold in fluid communication with an internal combustion engine, a forced induction device housing in fluid communication with the exhaust manifold and a hydrocarbon adsorber located in the forced induction device housing and positioned downstream of the forced induction device and exhaust manifold and positioned upstream of a catalyst substrate. The system further includes a first flow control device to control fluid communication between the forced induction device and the housing and a second flow control device to control fluid communication between the exhaust manifold and the hydrocarbon adsorber in the forced induction device housing.

In yet another exemplary embodiment of the invention, a method for directing exhaust gas includes receiving exhaust gas from an internal combustion engine into an exhaust manifold and controlling a first flow of the exhaust gas from the exhaust manifold via a forced induction device into a first passage of a housing downstream of the forced induction device. The method also includes controlling a second flow of the exhaust gas from the exhaust manifold into a second passage of the housing, wherein the second portion of the housing includes a hydrocarbon adsorber positioned upstream of a catalyst substrate.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION OF THE EMBODIMENTS

Figure 1:
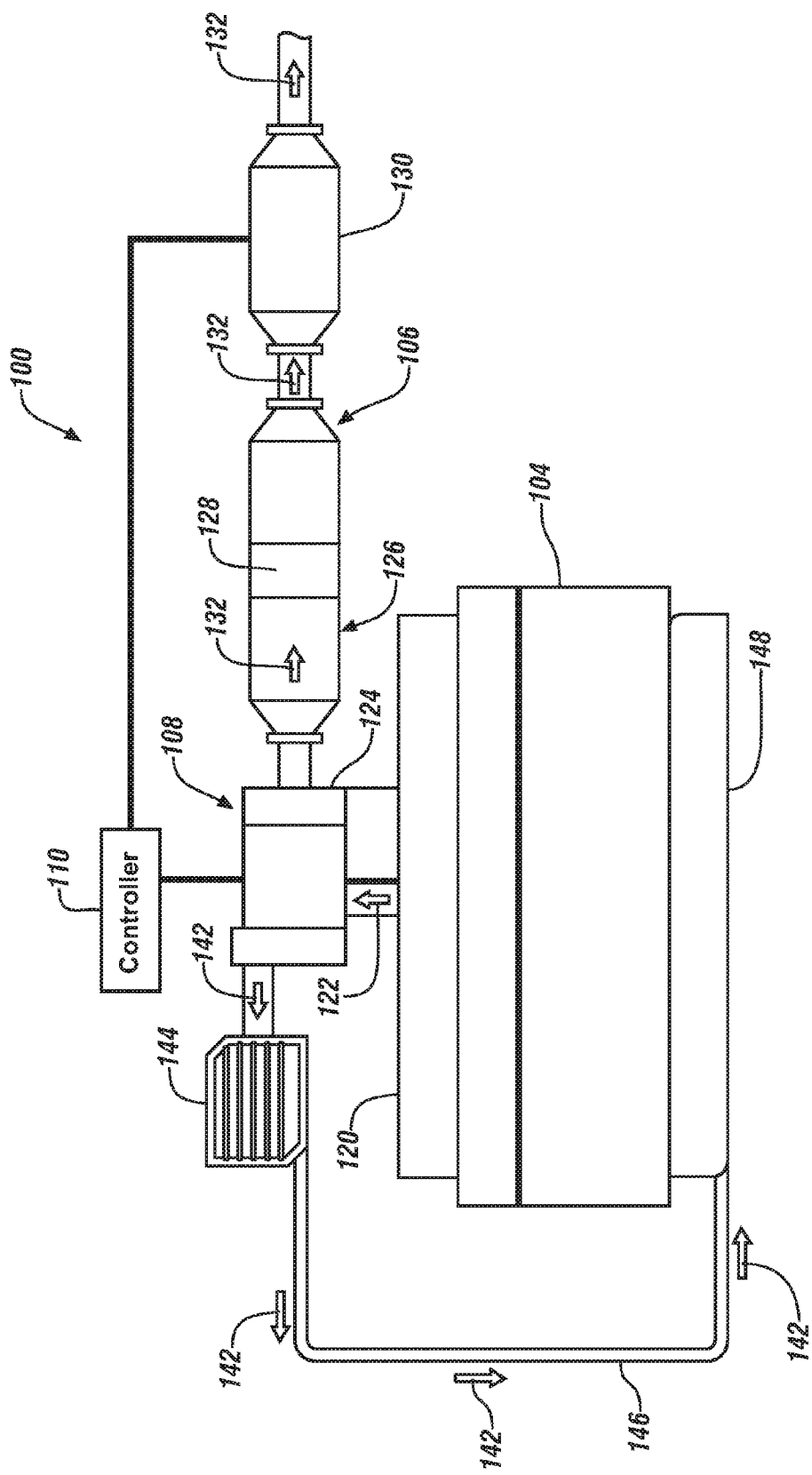
FIG. 1 illustrates an exemplary internal combustion engine.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIG. 1 illustrates an exemplary internal combustion engine 100, in this case an in-line four cylinder engine, including an engine block and cylinder head assembly 104, an exhaust system 106, a forced induction device, such as a turbocharger 108, and a controller 110. Coupled to the engine block and cylinder head assembly 104 is an exhaust manifold 120, which may be integrated with, or external to, the engine block and cylinder head assembly 104. In addition, the engine block and cylinder head assembly 104 includes cylinders (not shown) wherein the cylinders receive a combination of combustion air and fuel. The combustion air/fuel mixture is combusted resulting in reciprocation of pistons (not shown) located in the cylinders. The reciprocation of the pistons rotates a crankshaft (not shown) to deliver motive power to a vehicle powertrain (not shown) or to a generator or other stationary recipient of such power (not shown) in the case of a stationary application of the internal combustion engine 100. The combustion of the air/fuel mixture causes a flow of exhaust gas 122 through the exhaust manifold 120, the turbocharger 108 and into the exhaust system 106. Exemplary embodiments of the turbocharger 108 may utilize twin scroll or twin turbo technology.

The exhaust system 106 includes a canister 126 having a catalyst coated substrate 128 positioned inside the canister 126 (i.e. an exhaust treatment device) as well as an optional under floor exhaust treatment device 130. The exhaust gas 132 flows from the turbocharger 108 through the exhaust system 106, for the reduction of pollutants, and is then released into the atmosphere. In the depicted embodiment, the exhaust gas flow 122 drives a turbine wheel (not shown) of the turbocharger, thereby providing energy to create a compressed air charge 142. In an exemplary embodiment, the compressed air charge 142 is cooled by a charge cooler 144 and is routed through the conduit 146 to an intake manifold 148. The compressed air charge 142 provides additional combustion air (when compared to a non-turbocharged, normally aspirated engine) for combustion with fuel in the cylinders (not shown), thereby improving the power output and efficiency of the internal combustion engine 100. The catalyst coated substrate 128 may be any suitable catalyst design configured to reduce pollutants from a gas flow, such as a three-way catalyst. As used herein the term controller refers to an application specific integrated circuit (ASIC), an electronic circuit, a processor (shared, dedicated or group) and memory that executes one or more software or firmware programs, a combinational logic circuit, and/or other suitable components that provide the described functionality.

With continuing reference to FIG. 1, during startup of the exemplary internal combustion engine 100, components, such as the catalyst coated substrate 128, can take a selected amount of time to be warmed up to an operating temperature. Specifically, when heated to the operating temperature, the catalyst coated substrate 128 removes pollutants more effectively from the exhaust gas 132. Accordingly, a method and apparatus are provided for the turbocharger 108 and exhaust system 106 to enable the catalyst coated substrate 128 remove pollutants in the exhaust gas flow 122, 132 at the operating temperature, thereby reducing emissions. As discussed herein, the operating temperature for the catalyst coated substrate 128 is a temperature or range of temperatures where the catalyst is able to remove a sufficient amount of pollutants to achieve selected targets, such as meeting emission standards.

Figure 2:
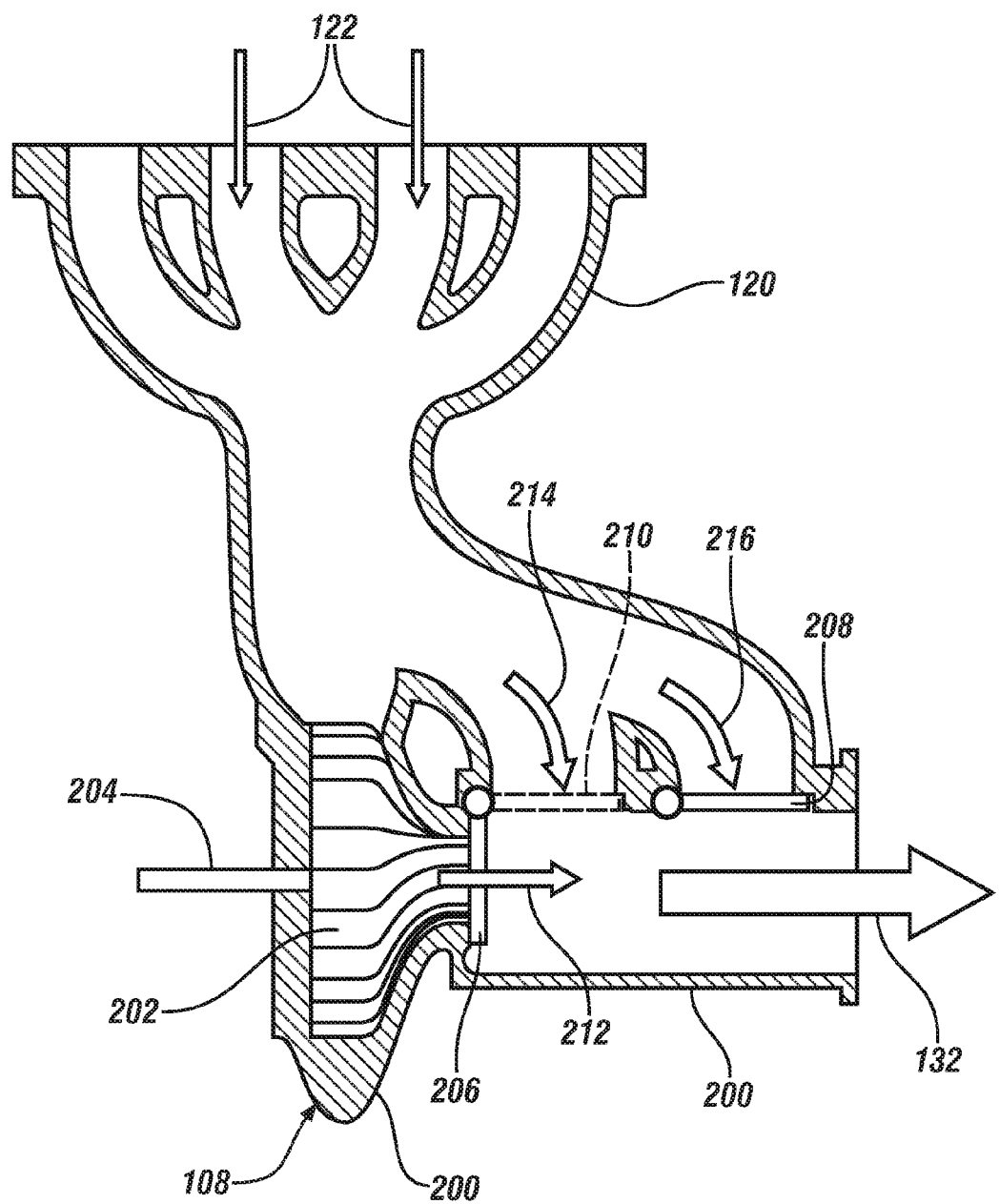
FIG. 2 is a side sectional view of a portion of an exemplary turbocharger.

FIG. 2 is a side sectional view of a portion of the exemplary turbocharger 108 in fluid communication with the exhaust manifold 120. Thus the turbocharger 108 is driven by the exhaust gas flow 122 received from the exhaust manifold 120. The turbocharger 108 includes a housing 200 that contains a turbine wheel 202 coupled to a compressor wheel (not shown) via a shaft 204. The housing 200 also contains a first flow control device 206 and a second flow control device 208. Further, the housing 200 includes passages in fluid communication with the catalyst coated substrate 128 (FIG. 1). The first flow control device 206 is shown in an isolation or open position. A closed position 210 of the first flow control device 206 is also illustrated, wherein the closed position 210 enables a first exhaust gas flow 212 from the turbocharger 108. In the isolation or open position of the first flow control device 206, the first exhaust gas flow 212 through the turbocharger 108 is restricted. Further, when the first flow control device 206 is in the closed position 210, a second exhaust gas flow 214 from the exhaust manifold 120 is restricted. In an embodiment, the first flow control device 206 is in the isolation position during an engine startup period, wherein the second exhaust gas flow 214 flows downstream as exhaust gas flow 132 into the catalyst coated substrate 128 (FIG. 1). The exhaust gas flow (132, 214) flows into the catalyst coated substrate 128 to heat the catalyst coated substrate 128 to an operating temperature, thereby improving pollutant reduction. After the catalyst coated substrate 128 reaches the operating temperature, the first flow control device 206 moves to the closed position 210, thereby enabling the first exhaust gas flow 212 from the turbocharger 108. Thus, during the startup period, the first exhaust gas flow 212 is restricted to enable heating of the catalyst coated substrate 128 by the second exhaust gas flow 214. This provides faster heating of the catalyst coated substrate 128 to the suitable operating temperature as compared to flowing all of the exhaust gas through the turbocharger 108, which can act as a heat sink that slows heating of the catalyst coated substrate 128 and may cause elevated emissions during startup. Accordingly, by directing exhaust gas (214, 132) during startup to heat the catalyst coated substrate 128, the arrangement improves pollutant reduction.

Exemplary flow control devices (206, 208) may operate as follows. The first flow control device 206 is in the isolation position during an engine startup period to allow the second exhaust gas flow 214 to flow from the exhaust manifold 120 downstream and into the catalyst coated substrate 128. During this time, the second flow control device 208 is closed. The second exhaust gas flow 214 bypasses the turbine wheel 202 to quickly heat the catalyst coated substrate 128 to an operating temperature. After heating the catalyst on the catalyst coated substrate 128 to the operating temperature, the first flow control device 206 may move to a completely (210) or partially restricted flow position, thereby allowing the first exhaust gas flow 212 into the heated catalyst coated substrate 128. Accordingly, the arrangement quickly heats the catalyst coated substrate 128 with exhaust gas flow 214 directly from the engine exhaust manifold 120 during the startup period to improve pollutant reduction. In an embodiment, the flow control devices (206, 208) are any suitable devices to selectively control and restrict fluid flow or fluid communication between passages, housings and/or cavities based on the device position. The second flow control device 208 operates as a wastegate valve to control a boost level of the turbocharger 108 during operation. Exemplary flow control devices (206, 208) include gates or valves that are controlled electrically, hydraulically or pneumatically. The flow control devices (206, 208) may be coupled to a suitable controller, such as controller 110 (FIG. 1). As discussed herein, restricting fluid flow includes partially and/or completely restricting flow, wherein the amount of fluid flowing may be controlled depending on system constraints and desired performance.

Figure 3:
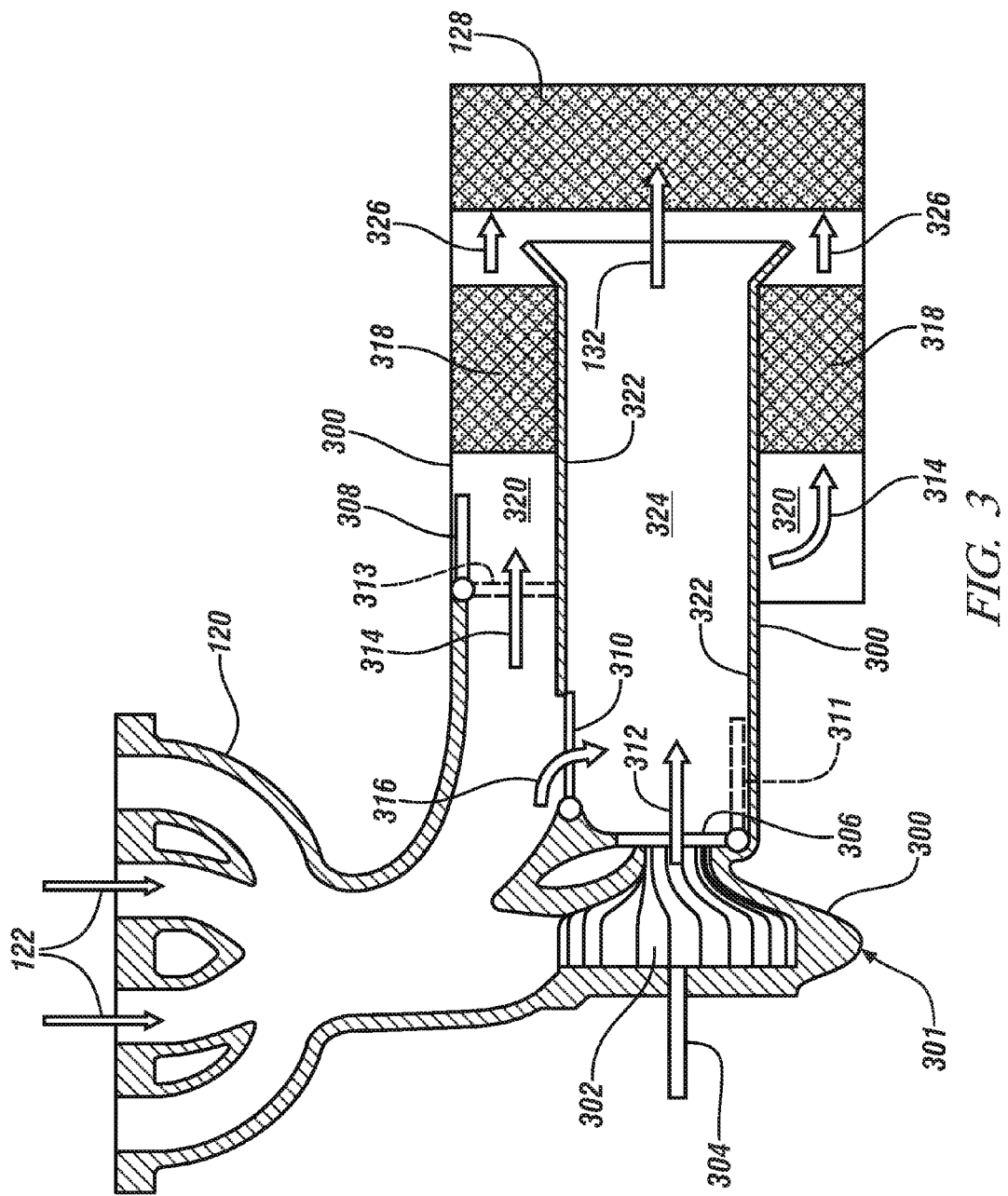
FIG. 3 is a side sectional view of a portion of an exemplary turbocharger.

FIG. 3 is a side sectional view of a portion of an exemplary turbocharger 301 in fluid communication with the exhaust manifold 120. The turbocharger 301 is configured to receive the exhaust gas flow 122 from the exhaust manifold 120. The turbocharger 301 includes a housing 300 that contains a turbine wheel 302 coupled to a compressor wheel (not shown) via a shaft 304. The housing 300 also contains a first flow control device 306, a second flow control device 308 and a third flow control device 310. The first flow control device 306 is shown in an isolation position. In addition, an open position 311 of the first flow control device 306 is illustrated, wherein the open position 311 enables a first exhaust gas flow 312 through the turbocharger 301. In the depicted isolation position, the first exhaust gas flow 312 from the turbocharger 301 is restricted by the first flow control device 306. The second flow control device 308 is shown in an open position that allows a second exhaust gas flow 314 into a hydrocarbon adsorber 318 located in an annular passage 320. A closed position 313 of the second flow control device 308 restricts the second exhaust gas flow 314 to reduce or restrict flow into the hydrocarbon adsorber 318. The amount of flow restriction caused by the position of the second flow control device 308 may vary depending on system conditions, as described below. The exemplary third flow control device 310 is a wastegate valve to control a boost level of the turbocharger 301 during operation. In an embodiment, the flow control devices (306, 308, 310) are any suitable devices to selectively control fluid flow based on the device position. Further, the flow control devices (306, 308, 310) may comprise a single flow control device or a plurality of flow control devices. Exemplary flow control devices (306, 308, 310) include gates or valves that are controlled electrically, hydraulically or pneumatically. The housing 300 may be formed from a single piece of cast metal or a plurality of pieces that are coupled via welds, fasteners or other suitable coupling devices. Further, the housing 300 is integrated with or includes passages or ducts in fluid communication with catalyst coated substrate 128.

Exemplary flow control devices (306, 308, 310) may operate as follows. The first flow control device 306 is in the isolation position during an engine startup period, wherein the second flow control device 308 is in an open position to allow the second exhaust gas flow 314 to flow from the exhaust manifold 120 downstream into the hydrocarbon adsorber 318. During this time, the third flow control device 310 is closed. The hydrocarbon adsorber 318 is configured to adsorb hydrocarbons from the second exhaust gas flow 314 when the hydrocarbon adsorber 318 is below a selected temperature (e.g., during startup). The hydrocarbon adsorber 318 retains the hydrocarbons while the hydrocarbon adsorber 318 and the catalyst coated substrate 128 are heated by an exhaust gas flow 314 and 326 during the startup period. After heating the catalyst coated substrate 128 to the operating temperature, the second flow control device 308 allows partially restricted second exhaust gas flow 314, thereby causing the exhaust gas flow 326 along with the adsorbed hydrocarbons to flow from the hydrocarbon adsorber 318 into the catalyst coated substrate 128. Accordingly, once the catalyst coated substrate 128 is heated to the operating temperature, the first flow control device 306 is moved to the open position 311 to allow exhaust gas flow 312 from the turbocharger 301 into a central passage 324. The central passage 324 is defined by a central wall 322 of the housing 300. The exhaust gas flow (312, 132) is directed into the catalyst coated substrate 128 after the startup period, wherein the heated catalyst coated substrate 128 removes pollutants from the gas. After the startup period, the second flow control device 308 partially restricts the exhaust gas flow 314, wherein the hydrocarbon adsorber 318 is heated above a selected temperature by the second exhaust gas flow 314 to release the hydrocarbons via exhaust gas flow 326 to the catalyst coated substrate 128. After a substantial amount of the hydrocarbons have been released from the hydrocarbon adsorber 318, the second flow control device 308 moves to the closed position 313. Therefore, during the startup period, the first exhaust gas flow 312 is restricted by the first flow control device 306 while the second flow control device 308 directs the second exhaust gas flow 314 into the hydrocarbon adsorber 318 to adsorb the pollutants until the catalyst coated substrate 128 is heated and is able to reduce pollutants.

With continuing reference to FIG. 3, the hydrocarbon adsorber 318 is a concentric annular member comprised of a material configured to adsorb hydrocarbons. The exemplary hydrocarbon adsorber 318 adsorbs hydrocarbons at or below a first selected temperature, such as when cool (e.g. during startup of the engine). The hydrocarbon adsorber 318 also allows a restricted exhaust gas flow 326 (with hydrocarbons removed) into the catalyst coated substrate 128, thereby heating the catalyst. After the hydrocarbon adsorber 318 is heated at or above a second selected temperature, the hydrocarbon adsorber 318 is configured to release a portion or all of the adsorbed pollutants. The second selected temperature may be about the same as the first selected temperature or greater than the first selected temperature, depending on adsorber materials. Thus, the arrangement of the housing 300, hydrocarbon adsorber 318 and flow control devices (306, 308) provide improved pollutant reduction by absorbing pollutants during the engine startup period and until the catalyst coated substrate 128 is heated, wherein the pollutants are released from the hydrocarbon adsorber 318 into the heated catalyst coated substrate 128 after the engine and components are heated to sufficient operating temperatures.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust system, comprising:
   an exhaust manifold in fluid communication with an internal combustion engine;
   a turbocharger in fluid communication with the exhaust manifold, the turbocharger comprising a housing;
   a flow control device to control fluid communication between the turbocharger and a catalyst substrate and to control fluid communication between the exhaust manifold and the catalyst substrate, the flow control device comprising a first flow control device and second flow control device, wherein the first flow control device controls a first flow of exhaust gas through the turbocharger and into the catalyst substrate and the second flow control device controls a second flow of exhaust gas from the exhaust manifold and into the catalyst substrate.

2. The system of claim 1, wherein the second flow of exhaust gas from the exhaust manifold comprises a second flow of exhaust gas into the catalyst substrate configured to enable heating of the catalyst substrate during a startup period.

3. The system of claim 1, comprising a hydrocarbon adsorber positioned upstream of the catalyst and downstream of the flow control device.

4. The system of claim 3, wherein the second flow control device controls the second flow of exhaust gas into the hydrocarbon adsorber, wherein the hydrocarbon adsorber stores hydrocarbons and allows a portion of the exhaust gas to flow into the catalyst substrate to heat the catalyst substrate during a startup period.

5. The system of claim 4, wherein the first flow control device opens to allow the first flow of exhaust gas through the turbocharger into the housing after the startup period while the second flow control device causes a partially restricted flow of the second flow of exhaust gas through the hydrocarbon adsorber, thereby releasing hydrocarbons from the hydrocarbon adsorber.

6. The system of claim 3, wherein the hydrocarbon adsorber is a concentric annular member placed about a central wall of the housing, the central wall defining a central passage for the first flow from the turbocharger into the catalyst.

7. The system of claim 1, wherein the catalyst comprises a three way catalyst.

8. An exhaust system, comprising:
   an exhaust manifold in fluid communication with an internal combustion engine;
   a turbocharger housing in fluid communication with the exhaust manifold;
   a hydrocarbon adsorber located in the turbocharger housing and positioned downstream of the turbocharger and exhaust manifold, and positioned upstream of a catalyst substrate;
   a first flow control device to control fluid communication between the turbocharger and the turbocharger housing; and
   a second flow control device to control fluid communication between the exhaust manifold and the hydrocarbon adsorber in the turbocharger housing.

9. The system of claim 8, wherein the first flow control device enables a first flow of exhaust gas through the turbocharger into the catalyst substrate after a startup period and the second flow control device enables a second flow of exhaust gas into the hydrocarbon adsorber during the startup period.

10. The system of claim 9, wherein the hydrocarbon adsorber is below a selected temperature during the startup period and is above the selected temperature after the startup period.

11. The system of claim 10, wherein the hydrocarbon adsorber adsorbs hydrocarbons below the selected temperature and releases hydrocarbons above the selected temperature.

12. The system of claim 8, wherein the hydrocarbon adsorber is a concentric annular member placed about a central wall of the housing, the central wall defining a central passage for fluid communication from the turbocharger into the catalyst substrate.

13. The system of claim 8, wherein the catalyst comprises a three way catalyst.

14. A method for directing exhaust gas, the method comprising:
  receiving exhaust gas from an internal combustion engine into an exhaust manifold;
  controlling a first flow of the exhaust gas from the exhaust manifold through a turbocharger into a first passage of a housing, wherein the housing includes at least a portion of the turbocharger, into a catalyst substrate in the housing and downstream of the turbocharger; and
  controlling a second flow of the exhaust gas from the exhaust manifold into a second passage of the housing, wherein the second passage of the housing includes a hydrocarbon adsorber positioned upstream of a catalyst substrate.

15. The method of claim 14, wherein controlling the second flow comprises controlling flow into a concentric annular hydrocarbon adsorber placed about a central wall of the housing, the central wall defining the first passage for fluid communication between the turbocharger into the catalyst substrate.

16. The method of claim 15, wherein controlling the first flow comprises controlling flow through the first passage and into the catalyst substrate.

17. The method of claim 15, wherein controlling the first flow comprises controlling the first flow through the turbocharger into the catalyst substrate.

18. The method of claim 15, wherein controlling the first flow comprises restricting flow through the first passage and into the catalyst substrate during a startup period.

19. The method of claim 18, wherein controlling the second flow comprises restricting flow through the concentric annular hydrocarbon adsorber after a startup period.

* * * * *